US009116418B2

(12) United States Patent
Mohan et al.

(10) Patent No.: US 9,116,418 B2
(45) Date of Patent: Aug. 25, 2015

(54) SPRING-LOADED CEILING MOUNT FOR A SECURITY CAMERA (71) Applicant: Avigilon Corporation, Vancouver (CA)

(72) Inventors: Sudeep Mohan, Surrey (CA); Yat Shun Yu, Burnaby (CA); Michael Neufeld, Vancouver (CA)

(73) Assignee: Avigilon Corporation, Vancouver (CA)

( * ) Notice: Subject to any disclaimer, the term of this patent is extended or adjusted under 35 U.S.C. 154(b) by 41 days.

(21) Appl. No.: 13/914,447

(22) Filed: Jun. 10, 2013

(65) Prior Publication Data

US 2014/0363148 A1 Dec. 11, 2014

(51) Int. Cl.
G03B 17/56 (2006.01)
G08B 13/196 (2006.01)

(52) U.S. Cl.
CPC ........ G03B 17/561 (2013.01); *G08B 13/19632* (2013.01); *Y10T 29/49826* (2015.01)

(58) Field of Classification Search
CPC . G03B 17/561; G08B 13/19632; F21V 21/04
USPC .......... 396/419, 423–424, 427–428; 248/343, 248/187.1; 348/143–144, 151
See application file for complete search history.

(56) References Cited

U.S. PATENT DOCUMENTS

| 6,752,520 | B2 | 6/2004 | Vernusset et al. |
| 7,621,680 | B2 | 11/2009 | Frick et al. |
| 8,245,993 | B2 | 8/2012 | Arnold |
| 2014/0023357 | A1* | 1/2014 | Wong et al. .................. 396/427 |

FOREIGN PATENT DOCUMENTS

| EP | 1321707 | | 6/2003 | |
| JP | 2006-222610 | * | 8/2006 | ............ H04N 5/222 |
| JP | 4464843 | | 5/2010 | |

OTHER PUBLICATIONS

Machine translation of JP2006-222610, Aug. 2006.*
International Search Report and Written Opinion of the International Searching Authority, mailed Mar. 6, 2014, for corresponding International Application No. PCT/CA2013/050439, 9 pages.
"Fixed Dome Selection Guide", http://www.pelco.com/documents/product/en/shared/selection-guides/fixed-domes-selection-guide.pdf, visited Jun. 10, 2013, 1 page.

(Continued)

*Primary Examiner* — Christopher Mahoney
(74) *Attorney, Agent, or Firm* — Klarquist Sparkman, LLP (57) ABSTRACT A ceiling mount for a security camera includes a back end located in a ceiling space when the ceiling mount is mounted, a front end located below the ceiling when the ceiling mount is mounted, and a spring-loaded clamp to clamp the ceiling mount to the ceiling. The spring-loaded clamp includes a spring connected to a force application member. The clamp can be locked in a loaded state before the mounting process begins. When in the loaded state the spring in the clamp is sufficiently deflected to allow the ceiling to pass between the front end and the force application member. During mounting, once the back end has been pushed into the ceiling space the clamp can be released from the loaded state, which allows the spring to push the force application member against the ceiling and secure the ceiling mount to the ceiling.

18 Claims, 12 Drawing Sheets

(56) References Cited

OTHER PUBLICATIONS

"Axis Communications Product List", http://www.axis.com/products/cam_ace/mounting/drop_celing.htm; visited Jun. 10, 2013, 2 pages.

"Avigilon Operating and Installation Instructions", for High Definition IP Dome Camera Indoor In-Ceiling Mount DOME-IND-CEL; http://ftp.avigilon.com/support/manuals/Avigilon_Accessory_Manual-DOME-IND-CEL.pdf ; visited Jun. 10, 2013, 12 pages.

* cited by examiner

SPRING-LOADED CEILING MOUNT FOR A SECURITY CAMERA

TECHNICAL FIELD

The present disclosure is directed at a spring-loaded ceiling mount for a security camera and at a security camera assembly comprising the security camera and the spring-loaded ceiling mount.

BACKGROUND

The global video surveillance market remains strong given the actual and perceived needs for surveillance in response to problems such as violent crime, property crime, and terrorism. In particular, a significant amount of activity in the global surveillance market relates to replacing analog security cameras with newer and more flexible digital surveillance cameras. Given this, there exists a continued need for solutions that can expedite and ease installation of surveillance equipment generally and security cameras in particular.

SUMMARY

According to a first aspect, there is provided a ceiling mount for a security camera. The ceiling mount comprises a mount body and a clamp secured to the mount body. The mount body comprises a back end located above a bottom of a ceiling when the ceiling mount is mounted and a front end connected to the back end and located below the bottom of the ceiling when the ceiling mount is mounted. The clamp comprises a force application member positioned to compress the ceiling against the front end when the clamp is closed and positioned to permit the ceiling to pass between the force application member and the front end when the clamp is open; and a spring, biasing the force application member, that is in a relatively deflected position when the clamp is open and in a relatively undeflected position when the clamp is closed.

The clamp may be lockable in a loaded state when the spring is in the relatively deflected position.

The clamp may be released from the loaded state by actuating a release mechanism located below the ceiling when the ceiling mount is mounted.

The release mechanism may comprise part of the ceiling mount and be secured to the mount body. Alternatively, the release mechanism may be separate from the ceiling mount and comprise, for example, a screwdriver.

The spring may comprise a compression coil spring, the clamp may comprise a channel along which the spring is located, and the front end may comprise a channel access port, aligned with the longitudinal axis of the coil spring, for receiving the release mechanism.

The channel may comprise a channel wall that prevents the ceiling from encroaching into the channel.

The force application member may comprise a flap having one end in the channel and a flap body connected to the one end in the channel. The flap may be rotatable about the longitudinal axis of the channel between a retracted position in which the flap body abuts against the back end and an extended position in which the flap body is spaced from the back end.

When in the extended position the flap body may cross the periphery of a portion of the front end pressed against the bottom of the ceiling when the ceiling mount is mounted to the ceiling.

The back end may further comprise a recess shaped to receive the flap body and to prevent the flap from moving along the channel. The recess may be located adjacent the channel and spaced from the front end such that the flap body is rotatable into the recess when the spring is in the relatively deflected position.

The back end may further comprise an outwardly extending protrusion located between the recess and the channel, the flap body may comprise a slot shaped to permit the protrusion to pass therethrough, and a top side of the protrusion may be angled downwards towards the front end.

The back end may comprise a camera opening for receiving the security camera and the front end may comprise a flange along at least a portion of the camera opening.

The channel access port may extend through the flange.

The ceiling mount may further comprise a screw head facing the channel access port and located at the end of the coil spring nearest the channel access port.

According to another aspect, there is provided a security camera assembly that comprises a security camera and a ceiling mount. The ceiling mount comprises a mount body to which the security camera is attached and a clamp secured to the mount body. The mount body comprises a back end located above a bottom of a ceiling when the ceiling mount is mounted and a front end connected to the back end and located below the bottom of the ceiling when the ceiling mount is mounted. The clamp comprises a force application member positioned to compress the ceiling against the front end when the clamp is closed and positioned to permit the ceiling to pass between the force application member and the front end when the clamp is open; and a spring, biasing the force application member, that is in a relatively deflected position when the clamp is open and in a relatively undeflected position when the clamp is closed.

According to another aspect, there is provided a method for mounting a security camera assembly comprising a security camera attached to a ceiling mount. The method comprises, prior to inserting a back end of the ceiling mount into a ceiling space: drilling a hole in a ceiling sized to accept the back end but not a front end of the ceiling mount that is connected to the back end; opening a clamp that comprises part of the ceiling mount, wherein opening the clamp comprises moving a spring used to bias the clamp from a relatively undeflected position to a relatively deflected position and wherein the clamp permits a ceiling to pass between the clamp and the front end when open; and locking the clamp open. The method also comprises placing the back end of the ceiling mount in the ceiling space and, while the back end of the ceiling mount is in the ceiling space, releasing the clamp to permit the spring to close the clamp, wherein the clamp clamps the ceiling between the back and front ends when closed.

The method may further comprise pressing the front end against a bottom of the ceiling while closing the clamp.

The clamp may comprise a flap having a flap body that is movable along and rotatable on the back end. The back end may comprise a recess shaped and located to receive the flap body when the clamp is open. The method may further comprise rotating the flap body away from the back end prior to locking the clamp open; opening the clamp comprises moving the flap away from the front end; locking the clamp open comprises rotating the flap body into the recess; and releasing the clamp comprises rotating the flap body out of the recess.

The method may further comprise rotating the flap body outwards prior to permitting the spring to close the clamp clamping the ceiling with the flap body rotated outwards.

The spring may comprise a compression coil spring, the front end may comprise a flange having a channel access port aligned with the spring, the back end may comprise a camera opening that receives the security camera, and releasing the clamp may be performed by inserting a release mechanism such as a screwdriver through the channel access port.

According to another aspect, there is provided a ceiling mount for a security camera, which comprises a back end having a camera opening shaped to receive the security camera; a flange around at least a portion of the camera opening, the flange having a channel access port extending therethrough; and a clamp secured to the back end. The clamp comprises a channel aligned with the channel access port, wherein the channel has a length selected such that a distance between the end of the channel nearest the channel access port and the channel access port is less than a thickness of a ceiling to which the ceiling mount is to be mounted; a compression coil spring extending along the channel and rotatable about the longitudinal axis of the channel; and a flap having one end connected to the spring and that moves along the channel when the spring deflects, wherein the length of the spring is selected such that the spring is at least deflected by a top of the ceiling when the flange is pressed against a bottom of the ceiling and the ceiling is between the flange and the flap.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

An in-ceiling mount camera refers to a camera that is designed to be mounted to and partially recessed behind a ceiling. A suitable ceiling is one in which a hollow cavity is behind the ceiling and is sufficiently large to accept a back end of the camera that is hidden from view when the camera is mounted; suitable ceilings may comprise, for example, drywall screwed on to joists and a suspended or "dropped" ceiling. In the case of a dome camera for example, the bulk of the camera is recessed behind the ceiling and only the hemispherical dome is visible below the ceiling. The portion of the camera that is above the bottom surface of the ceiling when the camera is mounted is the "back end" of the camera, while the volume of space above the bottom surface of the ceiling is the "ceiling space". A hole is cut in the ceiling that is slightly larger than required to allow the back end of the camera to be inserted through it. The camera is equipped with a mechanism to grip the ceiling and hold the camera securely in place.

Generally, these gripping mechanisms are difficult to operate because they are hidden from an installer's view behind the ceiling. They typically use a leadscrew-driven clamp that the installer screws to clamp the camera to the ceiling. This is cumbersome and time consuming for the installer, particularly since the installer is usually standing on a ladder while using one hand to support the camera while screwing the leadscrew.

The depicted embodiments are directed at a spring-loaded ceiling mount for a security camera, a security camera assembly comprising the security camera and the spring-loaded ceiling mount, and a method for mounting the security camera assembly. The ceiling mount comprises a clamp that uses a spring to bias a force application member. Prior to inserting the back end of the ceiling mount into the ceiling space the installer "loads" the clamp by deflecting the spring until the clamp is open and by then locking the clamp open. After the back end of the ceiling mount is in the ceiling space, the installer releases the clamp and the spring consequently pushes the force application member against the ceiling, clamping the ceiling between the force application member and a front end of the ceiling mount that is below the ceiling, thereby securely mounting the security camera assembly. The installer can accordingly mount the security camera assembly to the ceiling relatively quickly and without having to hold the camera up while screwing a leadscrew-driven clamp.

Figure 1:
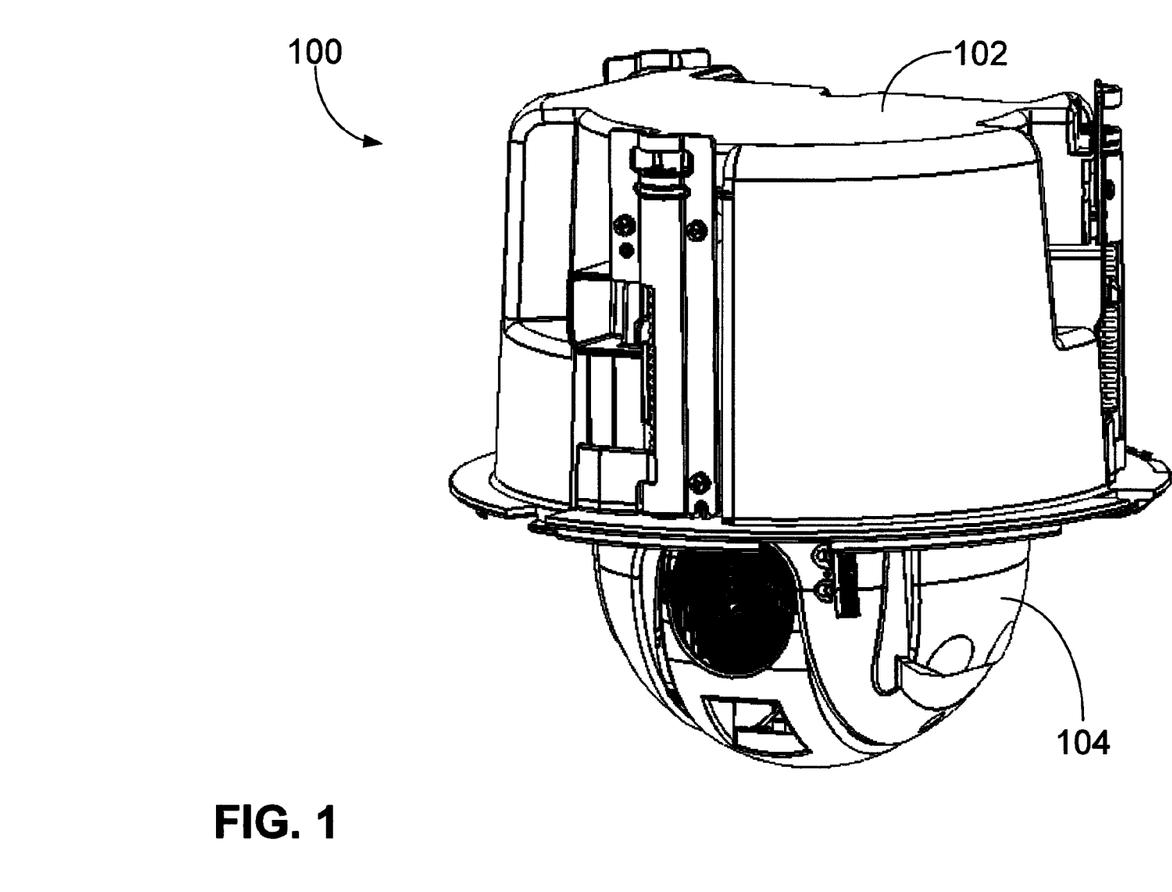
FIG. 1 is a perspective view of a security camera assembly comprising a ceiling mount and a security camera, according to one embodiment.
Figure 2A:
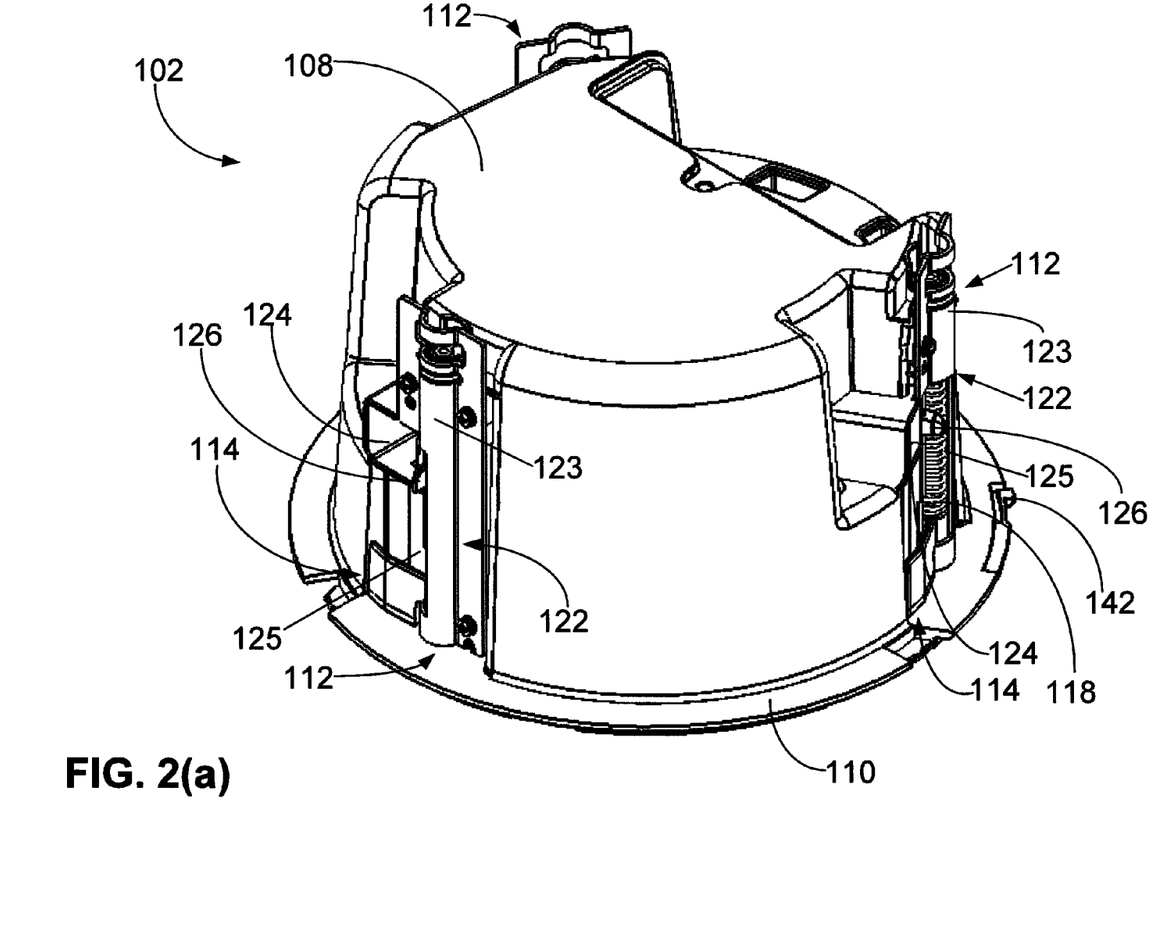
FIGS. 2(a)-(g) are perspective, front elevation, right side elevation, rear elevation, top plan, left side elevation, and bottom plan views, respectively, of the ceiling mount.
Figure 2B:
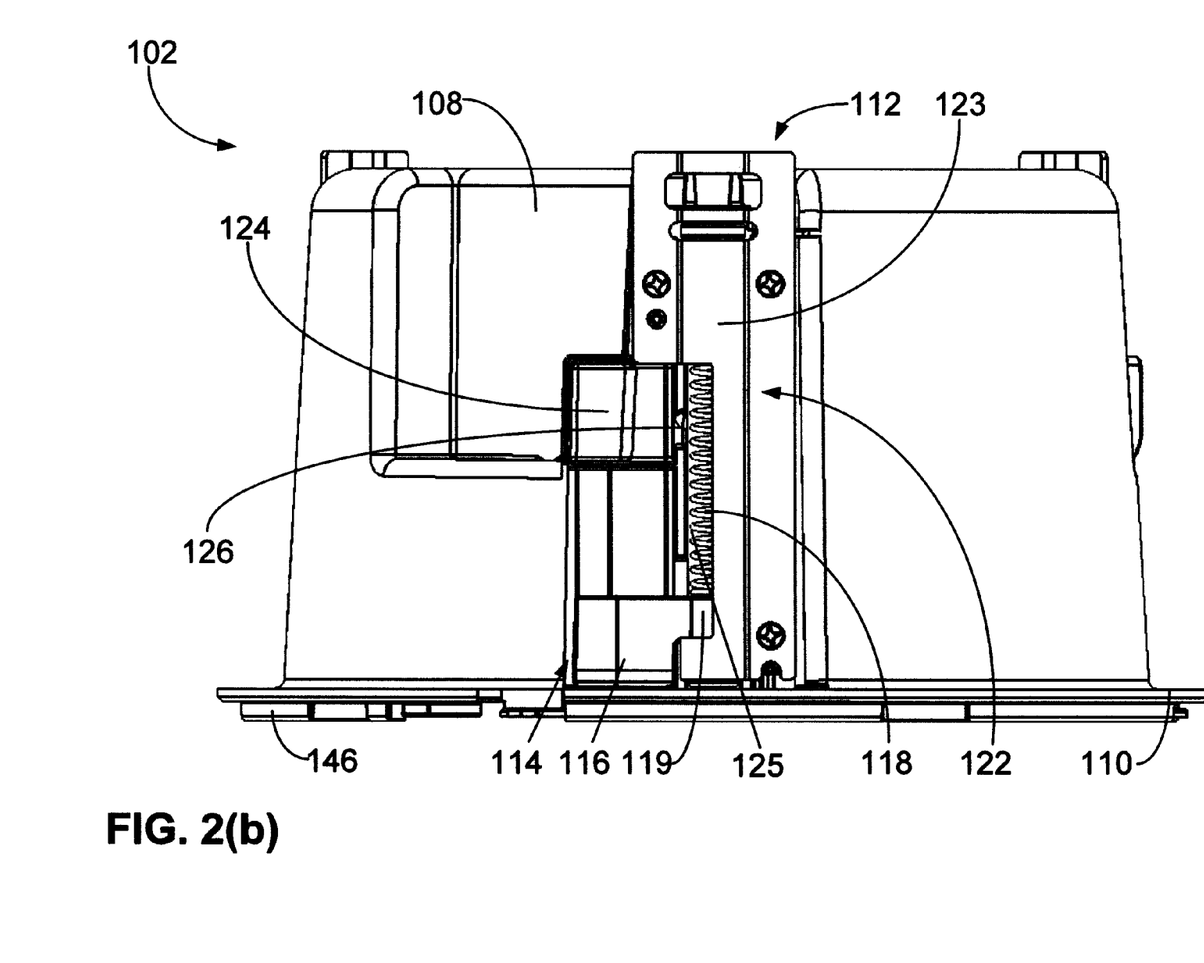
Figure 2C:
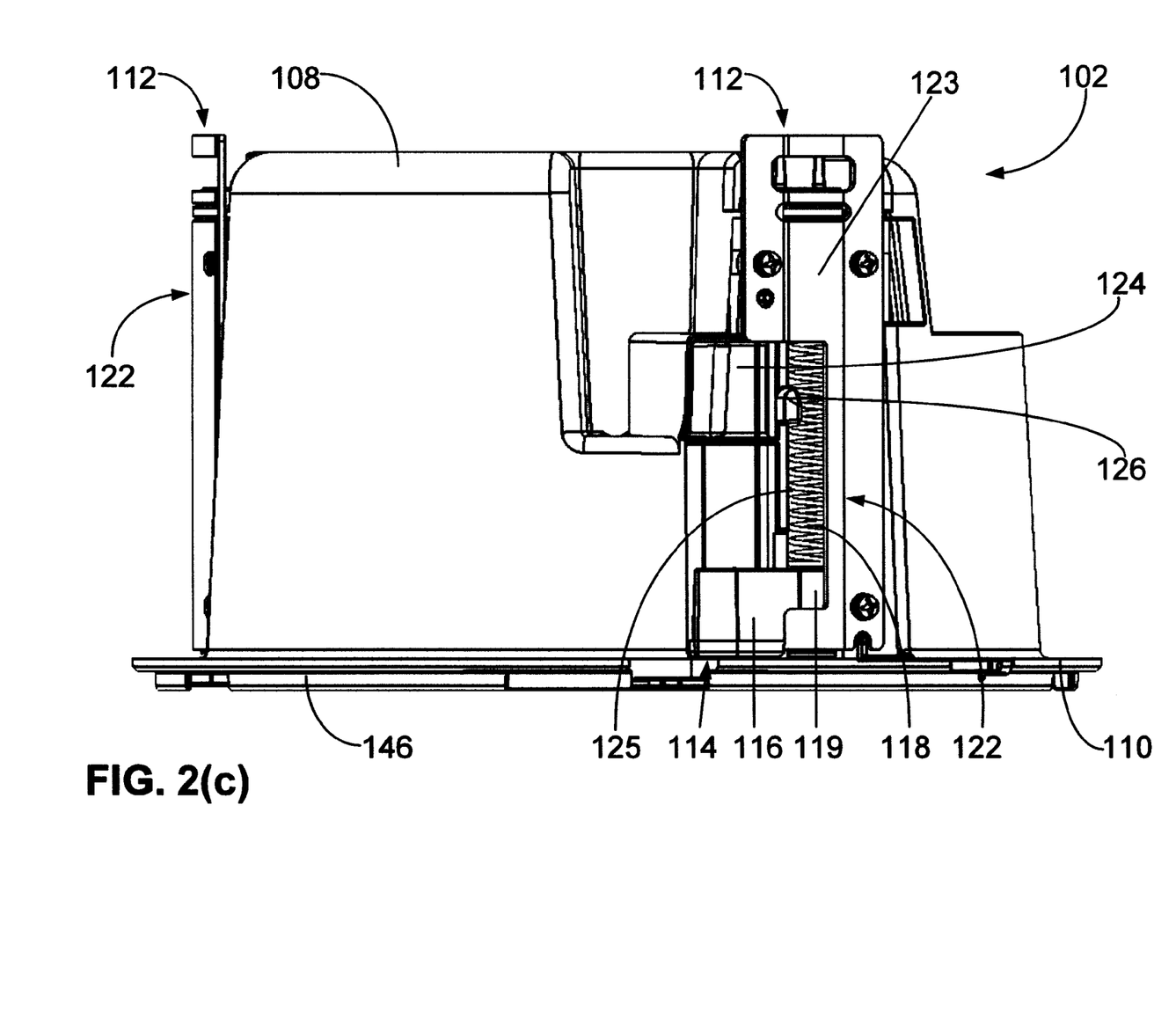
Figure 2D:
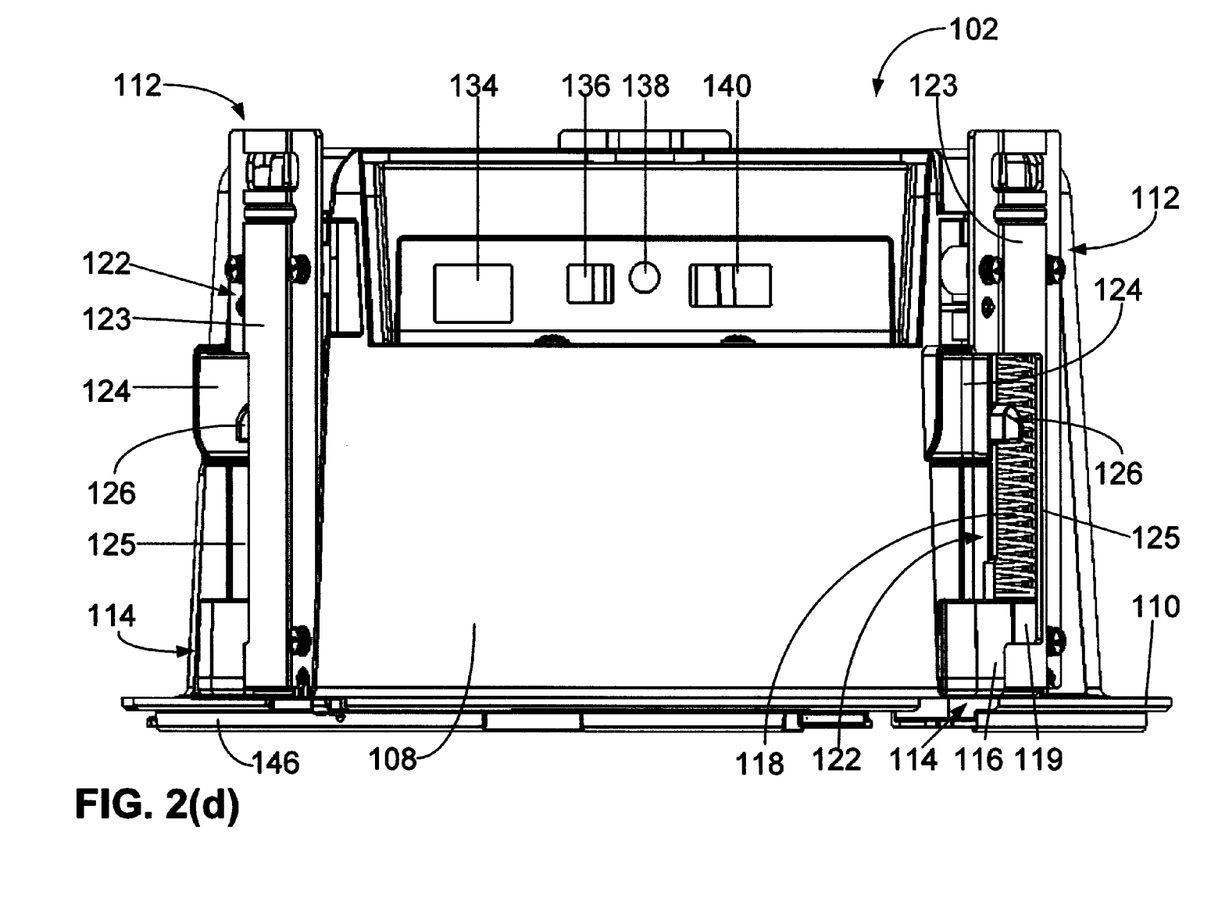
Figure 2E:
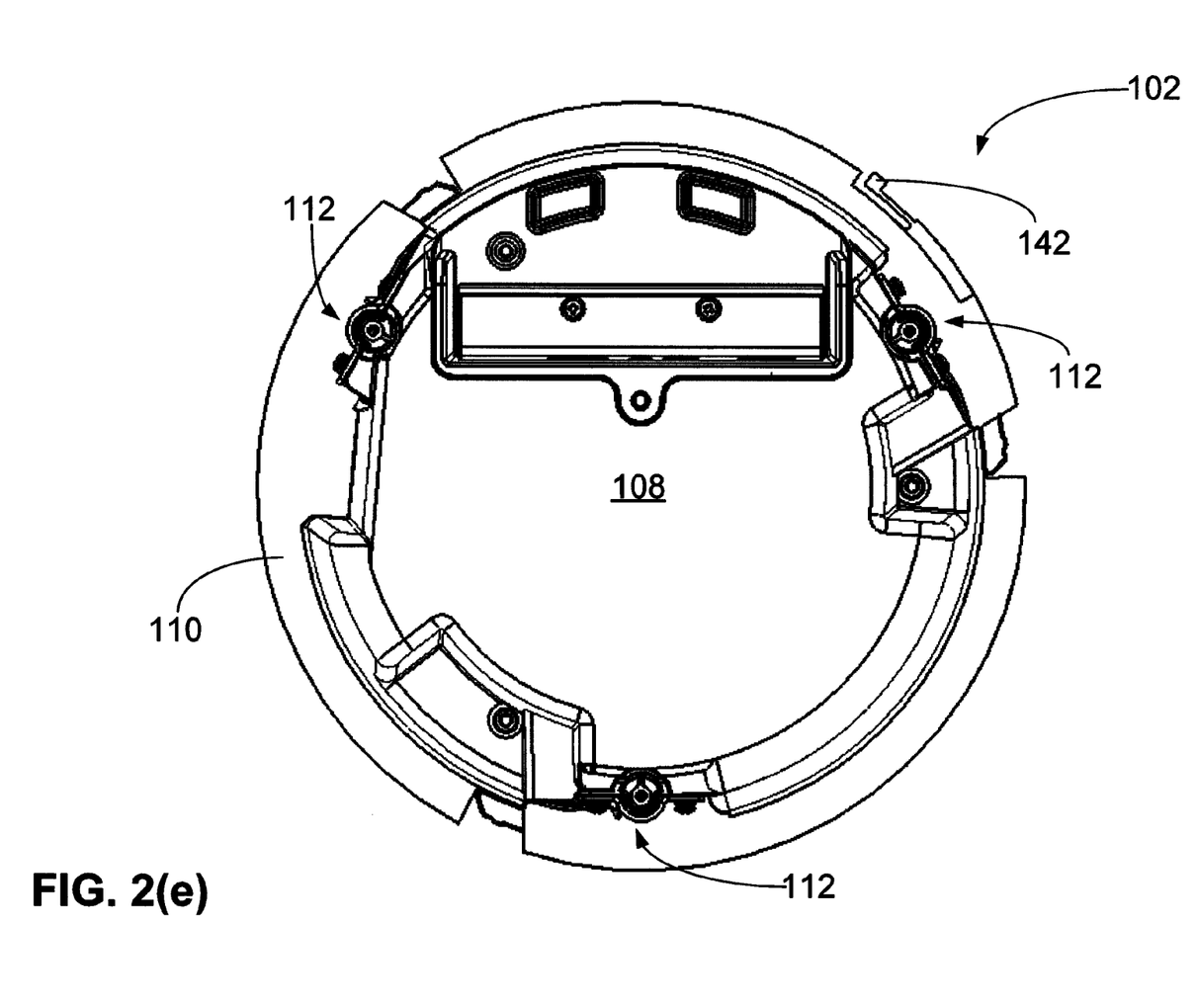
Figure 2F:
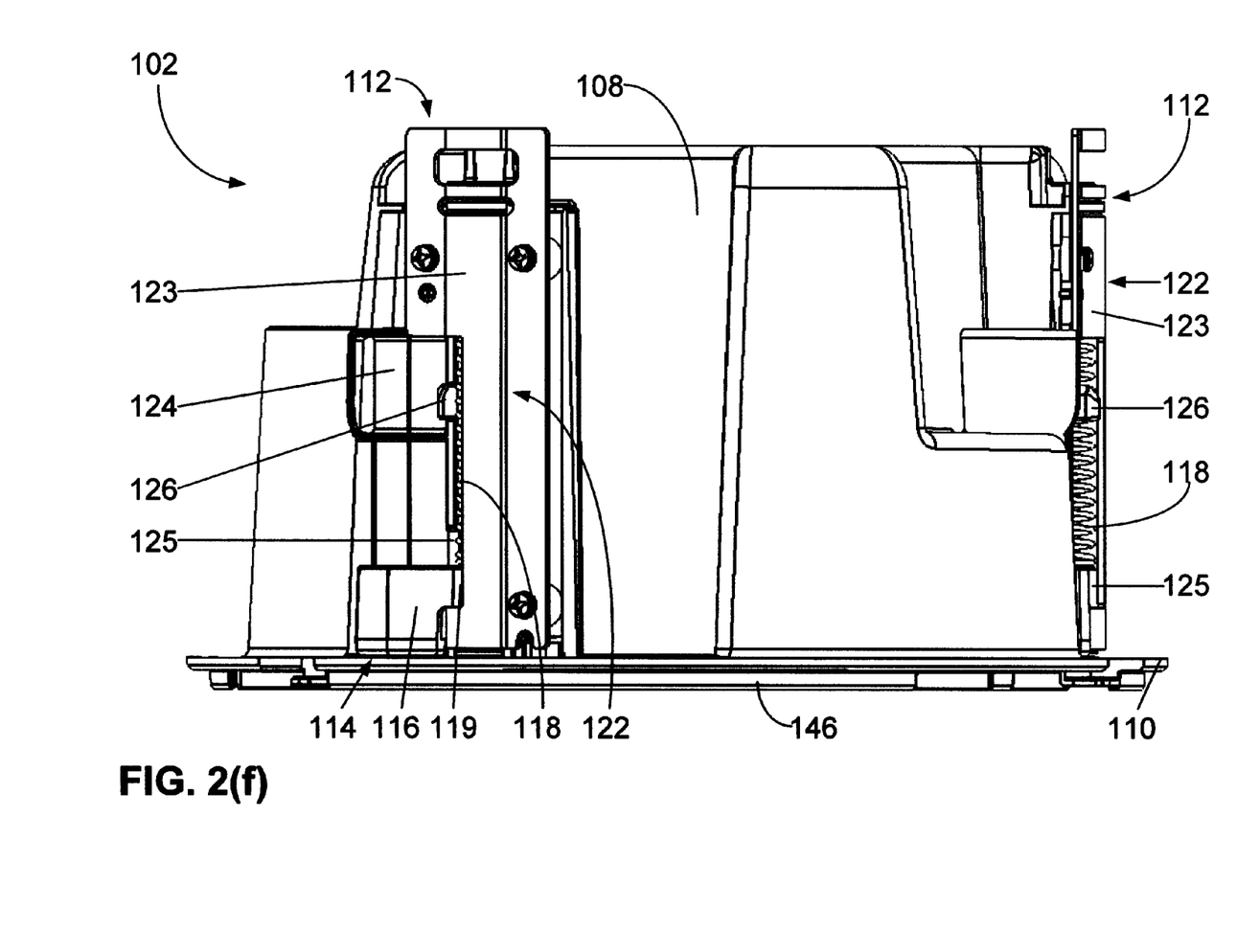
Figure 2G:
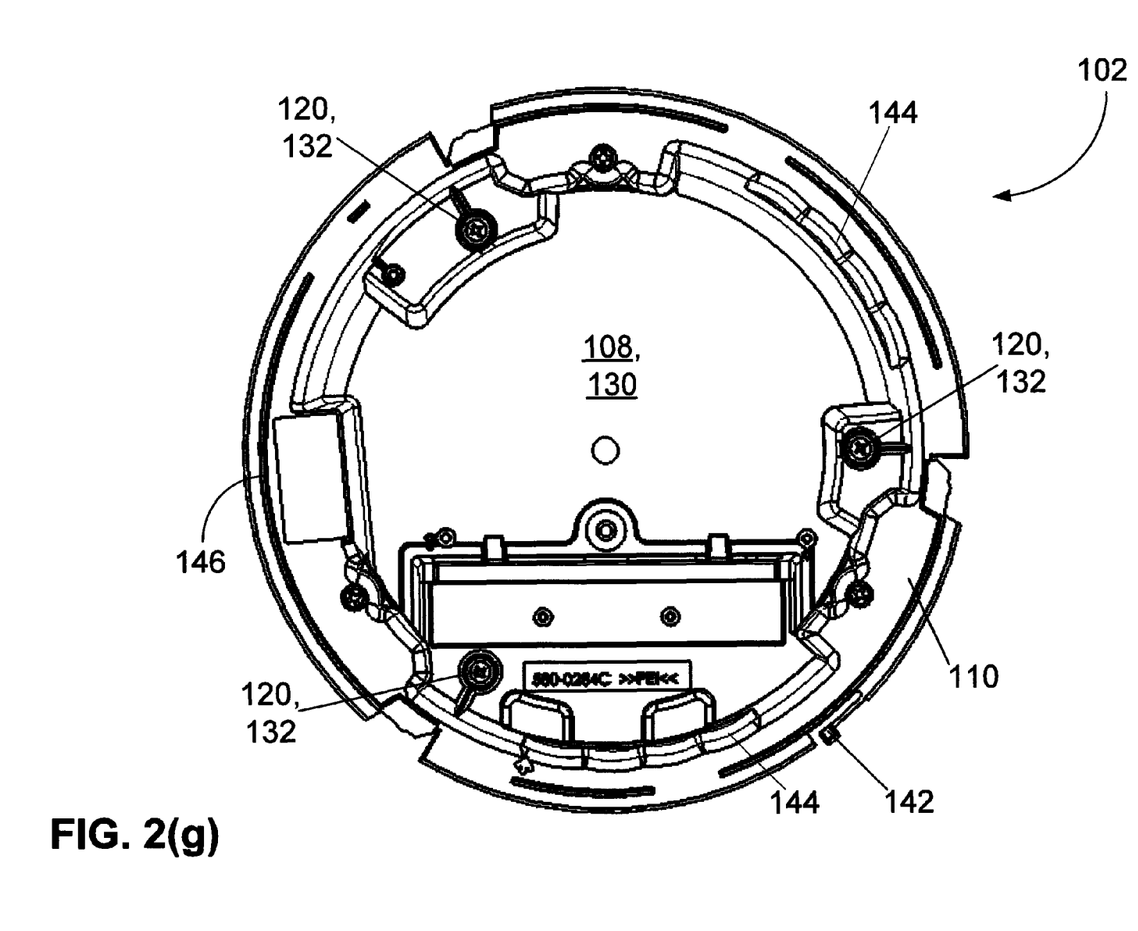

Referring now to the figures, FIG. 1 shows a security camera assembly 100 comprising a ceiling mount 102 and a security camera 104 inserted into the ceiling mount 102 through a camera opening 130 (shown in FIG. 2(g)) at the bottom of the ceiling mount 102, while FIGS. 2(a)-(g) show perspective, front elevation, right side elevation, rear elevation, top plan, left side elevation, and bottom plan views, respectively, of the ceiling mount 102 in isolation. The ceiling mount 102 comprises a substantially cylindrical back end 108, which is the portion of the ceiling mount 102 that is in the ceiling space when the security camera assembly 100 is mounted to a ceiling A (shown in FIGS. 3(e)-(h)). Below the back end 108 is a front end of the ceiling mount 102, which comprises a flange 110 that circumscribes the camera opening 130. The front end also comprises a ridge 146, extending downwards from portions of the bottom of the flange 110, for interlocking with a camera cover (not shown) and a cover release tab 142 for locking the front end to and releasing the front end from the camera cover. A pair of hand grips 144 are spaced peripherally along the front end to help the installer hold the ceiling mount 102 while mounting it to the ceiling A. The back end 108 and front end collectively comprise the mount body.

A trapezoidal recess is located in a top, rear portion of the back end 108. Located in a vertical wall of the trapezoidal recess are various ports through which signals are transmitted to and received from the security camera 104: an Ethernet port 134; a power connector port 136; an A/V port 138; and I/O terminals 140.

Three clamps 112 are secured to and are equally spaced peripherally around the exterior of the back end 108. Each of the clamps 112 comprises a vertically extending channel 122 along which extends a compression coil spring 118. The longitudinal axes of the channel 122 and the spring 118 are collinear. A top portion 123 of the channel 122 is tubular while a slot 125 is present in a bottom portion of the channel 122 ("channel slot 125"). Located on the end of the spring 118 closest the flange 110 is a force application member in the form of a flap 114. The flap 114 comprises one end 119 that is attached to this bottommost end of the spring 118 ("rotatable end 119") and a flap body 116 that is integral with the rotatable end 119. The channel slot 125 permits the spring 118, and consequently the flap 114, to rotate about the longitudinal axis of the channel 122. On the bottom of the rotatable end 119 is a screw head 132 aligned with the longitudinal axis of the spring 118, and a channel access port 120 is present in the flange 110 that is also aligned with the longitudinal axis of the spring 118. The channel access port 120 allows the installer to insert a release mechanism such as a screwdriver B (shown in FIGS. 3(c), (d), (f), and (g)) through the channel access port 120 and against the screw head 132 to compress the spring 118, rotate the flap 114, or both. In FIGS. 1 and 2(a)-(g), the spring 118 biases the flap 114 against the flange 110; when in this position, the spring 118 is in a "relatively undeflected position" and the clamp 112 is in a "non-loaded" state.

The spring 118 can be compressed until the flap 114 abuts against the top edge of the channel slot 125; when the flap 114 abuts against this edge the spring 118 is in a "relatively deflected position" and the clamp 112 is open. The channel 122 has a length selected such that the distance between the end of the channel 122 nearest the channel access port 120 and the channel access port 120 itself is less than the thickness of the ceiling A to which the ceiling mount 102 is to be mounted. Additionally, the length of the spring 118 is selected such that the spring 118 is at least deflected by the top of the ceiling A when the flange 110 is pressed against the bottom of the ceiling A and the ceiling A is between the flange 110 and the flap 114. In the relatively deflected position, the clamp 112 accordingly permits the ceiling A to pass between the flap 114 and the flange 110. Adjacent the top edge of the channel slot 125 is a recess 124 having a top side aligned with the top edge of the channel slot 125 and that is shaped to receive the flap body 116. When the spring 118 is in the relatively deflected position the flap body 116 is rotatable into the recess 124. When in the recess 124 the spring is locked in the relatively deflected position, the clamp 112 is accordingly locked open, and the clamp 112 is referred to as being in the "loaded" state.

When the installer wants to rotate the flap body 116 out of the recess 124, the installer inserts the screwdriver B into the screw head 132 and then rotates the screwdriver B clockwise to rotate the flap body 116 out of the recess 124. The installer can then slowly relieve pressure on the screwdriver B to permit the spring 118 to push the flap 114 downwards. If the flange 110 is pressed against the bottom of the ceiling A, the spring 118 will bias the flap body 116 against the top of the ceiling A and clamp the ceiling mount 102 to the ceiling A. If there is no ceiling A, such as in FIGS. 1 and 2(a)-(g), then the spring 118 will press the flap 114 against the flange 110.

Between the recess 124 and the channel 122 is an outwardly extending protrusion 126 that is shaped to fit through a slot 128 located in the flap body 116. The protrusion 126 has a base connected to the back end 108 and a tip spaced from the back end 108. When the clamp 112 is being locked while in the loaded state and the flap body 116 is being rotated into the recess 124 the protrusion 126 passes through the slot 128. The protrusion 126 similarly passes through the slot 128 when the clamp 112 is released from the loaded state and the flap body 116 is rotated, in an opposite direction, out of the recess 124. The top side of the tip of the protrusion 126 is angled downwards, towards the flange 110, so that if the bottom edge of the flap body 116 is pushed against the angled tip of the protrusion 126 by the spring 118 the flap body 116 is pushed outwards and rotated away from the back end 108.

Figure 3:
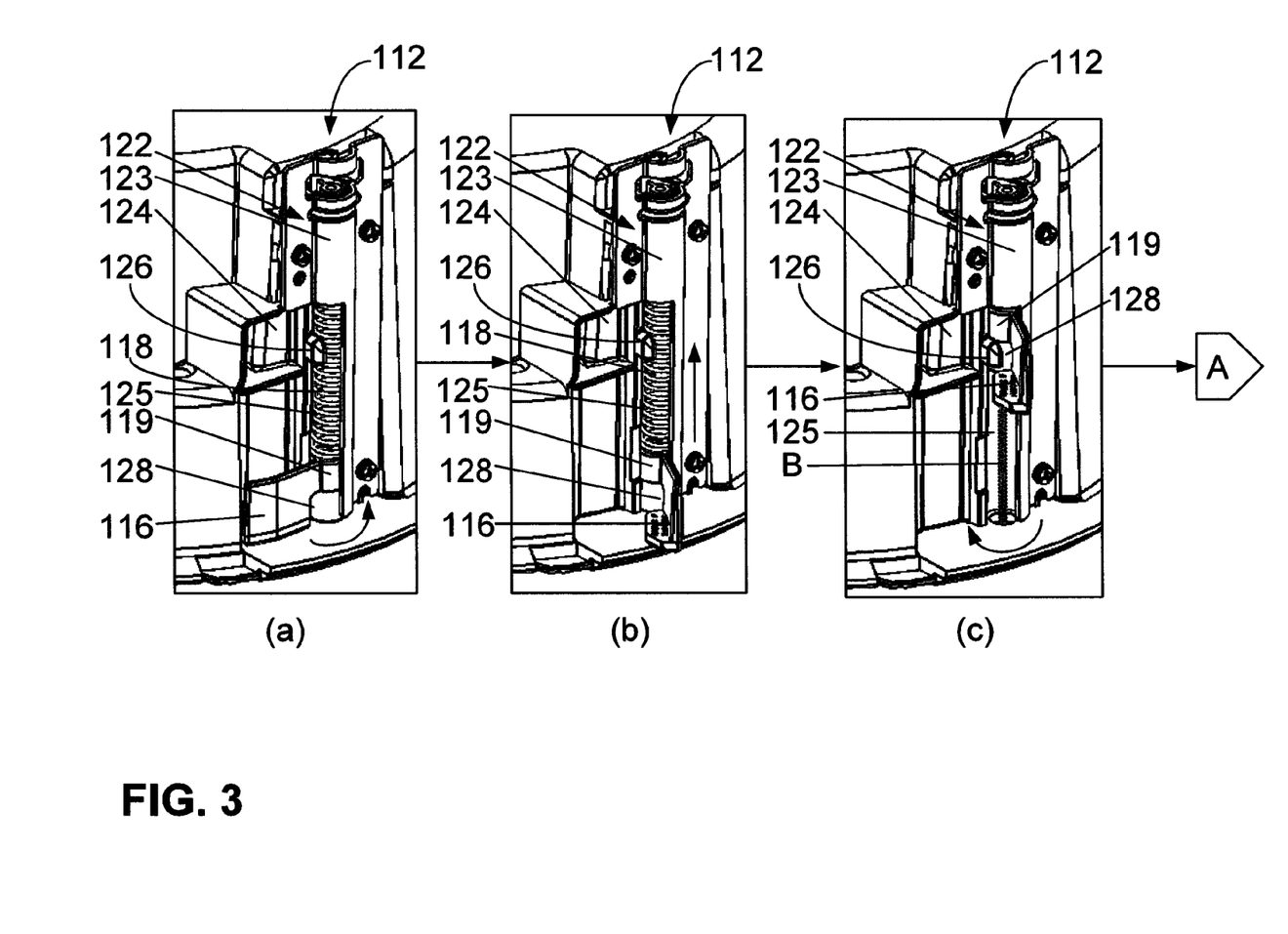
FIGS. 3(a)-(h) depict the security camera assembly, and in particular a portion of a clamp comprising part of the ceiling mount, at various times during mounting of the security camera assembly.

The flap body 116 is rotatable between two positions. In FIGS. 1 and 2(a)-(g), it is in a retracted position in which it abuts against the back end 108. As shown in FIGS. 3(b), (c), and (h), when rotated outwards into an extended position the flap body 116 is spaced from the back end 105. When the flange 110 is pressed against the ceiling A, a portion of the wall of the channel 122 that surrounds the channel slot 125 prevents the ceiling A from entering the channel 122 and blocking the screwdriver B from being able to push against the rotatable end 119 of the flap 114. The channel slot 125's wall similarly reduces the area by which the ceiling A and flap body 116 overlap when the flap body 116 is in the retracted position. Consequently, when the flap body 116 is used to clamp the ceiling mount 102 to the ceiling A it is rotated into the extended position in order to increase the amount of surface area overlap between it and the ceiling A. In FIGS. 3(b), (c), and (h), for example, the flap body 116 is rotated to extend well past the wall of the channel slot and over the periphery of the flange 110. As discussed above, the protrusion 126 facilitates rotation of the flap body 116 from the retracted to the extended position as the flap body 116 descends down the back end 108 towards the flange 110.

While the depicted embodiment uses a compression coil spring, in alternative embodiments (not depicted) other types of springs may be used. For example, a leaf spring may be used, a torsion spring may be used, or a tension coil spring may be used if a pulley is added to the back end 108.

Furthermore, while the channel slot 125's wall in the depicted embodiment prevents the ceiling A from covering the channel access port 120 and thereby facilitates the installer releasing the clamp 112 from under the ceiling A by inserting a release mechanism such as the screwdriver B through the channel 122, in alternative embodiments (not depicted) the installer may release the clamp 112 in different ways. For example, in these alternative embodiments instead of the release mechanism being separate from the ceiling mount 102 as the screwdriver B is, the ceiling mount 102 may comprise a release mechanism such as a switch, a relay, a mechanical push-button, or a lever, each of which may be actuated from below the ceiling A when the ceiling mount 102 is mounted. If the release mechanism is the push-button, for example, the push-button may be mounted to the front end.

Additionally, in the depicted embodiment the channel access port 120 is a hole in the flange 110. In alternative embodiments (not depicted), the channel access port 120 may comprise any type of suitable aperture in the front end that allows the installer to release the clamp 112 while the installer is supporting the ceiling mount 102 from beneath the ceiling A. For example, the channel access port 120 may alternatively be a notch or slot in the flange 110.

Also in an alternative embodiment (not depicted), the protrusion 126 may additionally or alternatively be used as an anti-rotation device to prevent the flap body 116 from inadvertently rotating out of the recess 124. For example, the protrusion 126 may extend sufficiently outwardly that it collides with the flap body 116 if the flap body 116 is rotated into the recess 124 when the bottom of the flap body 116 is coplanar with the bottom of the recess 124. Consequently, to rotate the flap body 116 into the recess 124, the height of the flap body 116 may be selected so that when the flap 114 abuts against the top edge of the channel slot 125 the bottom of the flap body 116 is above the top of the protrusion 126, thereby permitting the flap body 116 to be rotated into the recess 124 over the protrusion 126. Once the flap body 116 is within the recess 124 the installer can cease compressing the spring 118 and the spring 118 will bias the flap body 116, and more particularly the slot 128, against the protrusion 126. In this alternative embodiment, to rotate the flap body 116 out of the recess 124 the installer would push the flap 114 against the top edge of the channel slot 125 and then rotate the flap body 116 out of the recess 124, which would help prevent inadvertent rotation of the flap body 116 out of the recess 124.

Operation

Figure 4:
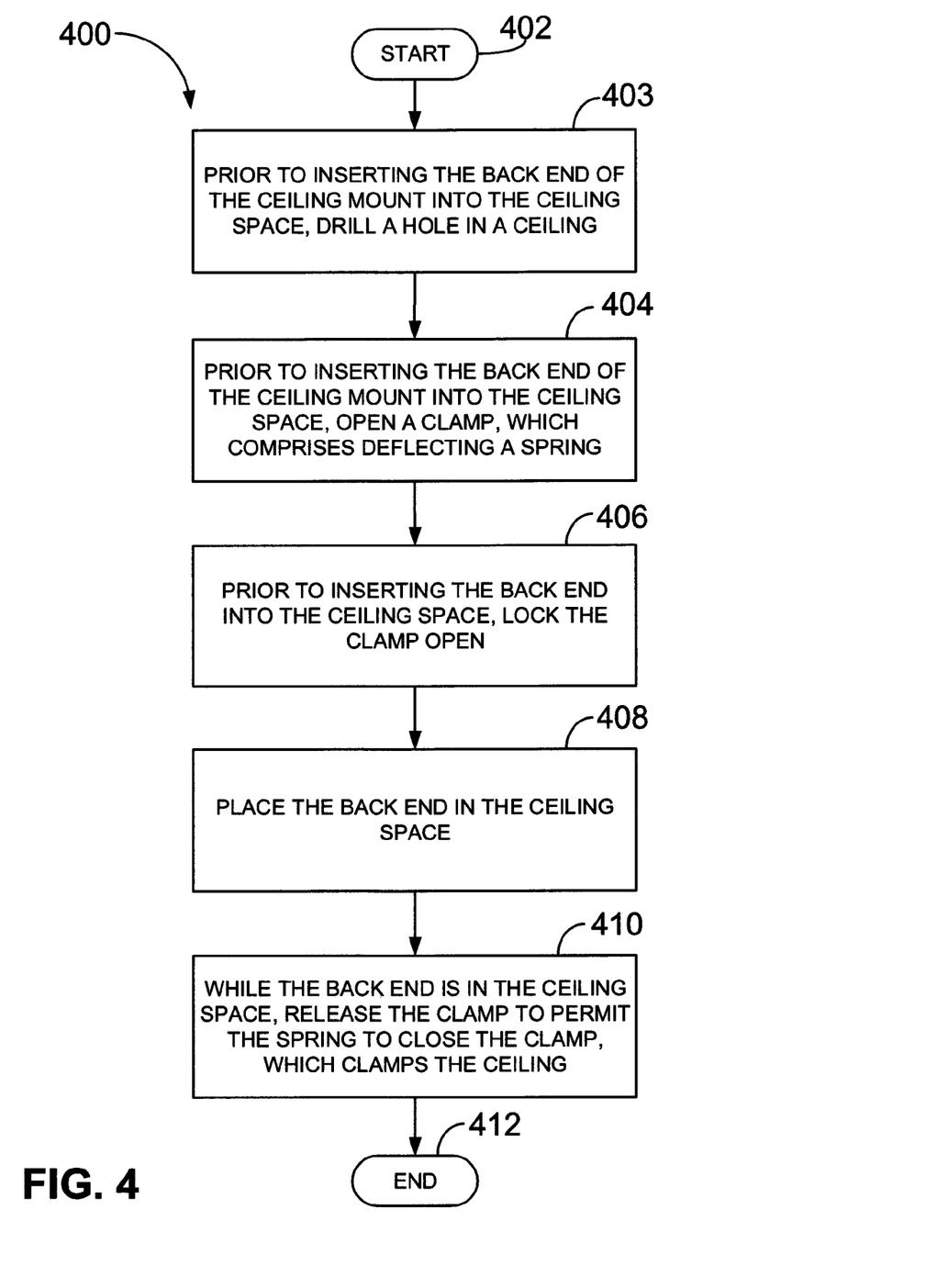
FIG. 4 shows a method for mounting the security camera assembly, according to another embodiment.

Referring now to FIG. 4, there is shown a method 400 that the installer can use to mount the security camera assembly 100 to the ceiling A, according to another embodiment. The method 400 is described in conjunction with FIGS. 3(a)-(h), which depict one of the clamps 112 of the ceiling mount 102 at different times during performance of the method 400.

The installer begins performing the method 400 at block 402 and proceeds to block 403 where he or she drills a hole in the ceiling A sized to accept the back end 108 but not the front end. In the depicted embodiment, the hole is sized larger than the diameter of the camera opening 130 but smaller than the outer diameter of the flange 110, which allows the flange 110 to be pressed against the bottom of the ceiling A when the security camera assembly 100 is mounted. More generally, the hole in the ceiling A has a diameter larger than the breadth of the back end 108 but smaller than the breadth of the front end.

After drilling the hole the installer then proceeds to block 404 where, also prior to inserting the back end 108 into the ceiling space, the installer opens the clamp 112 as shown in FIGS. 3(a)-(c). The installer takes the screwdriver B and inserts its end through the channel access port 120 and into the screw head 132. The installer turns the screwdriver B clockwise, as indicated by the arrow in FIG. 3(a), which transitions the flap body 116 from the retracted position to the extended position; the flap body 116 is shown in the extended position in FIG. 3(b). The installer then pushes the screwdriver B towards the top of the clamp 112 as shown by the arrow in FIG. 3(b) until the rotatable end 119 hits the top edge of the channel slot 125. This compresses the spring 118 from the relatively undeflected position shown in FIG. 3(b) to the relatively deflected position shown in FIG. 3(c).

The installer then proceeds to block 406 where he or she locks the clamp 112 open. While the rotatable end 119 is pressed against the channel slot 125's top edge, the installer rotates the screwdriver B counterclockwise as indicated by the arrow in FIG. 3(c). This rotates the flap body 116 into the recess 124. The installer then pulls the screwdriver B out of the channel 122 and the channel access port 120, which allows the spring 118 to bias the flap body 116 against the bottom of the recess 124 and on the protrusion 126. When in this position the clamp 112 is in the loaded state and is locked open, as shown in FIG. 3(d).

The installer then proceeds to block 408 where he or she places the back end 105 of the security camera assembly 100 into the ceiling space, as shown in FIG. 3(e). In the depicted embodiment the installer pushes the security camera assembly 100 until the flange 110 is pressed against the bottom of the ceiling A.

While the back end 108 is in the ceiling space the installer releases the clamp 112 at block 410, which permits the spring 118 to bias the flap body 116 against the ceiling A, thereby clamping the ceiling A between the flap body 116 and the flange 110. The installer does this by inserting the screwdriver B through the channel access port 120 and into the screw head 132 as shown in FIG. 3(f). The installer then rotates the flap body 116 out of the recess 124 as shown by the arrow in FIG. 3(f). The installer rotates the screwdriver B counterclockwise, which moves the flap body 116 from the retracted position to the extended position and which is depicted in FIG. 3(g). The installer then removes the screwdriver B from the channel 122 entirely and the spring 118 presses the flap body 116 against the ceiling A as shown in FIG. 3(h). The ceiling A is accordingly clamped between the flap body 116 and the flange 110.

To apply the method 400 to all three of the clamps 112, the installer drills the hole in the ceiling at block 403 once, and performs blocks 404 and 406 three times to open and then lock each of the three clamps 112 in the loaded state. The installer then inserts the back end 105 into the ceiling space at block 408, and releases each of the three clamps 112 by performing block 410 three times.

It is contemplated that any part of any aspect or embodiment discussed in this specification can be implemented or combined with any part of any other aspect or embodiment discussed in this specification.

FIG. 4 is a flowchart of an exemplary method. Some of the blocks illustrated in the flowchart may be performed in an order other than that which is described. Also, it should be appreciated that not all of the blocks described in the flow chart are required to be performed, that additional blocks may be added, and that some of the illustrated blocks may be substituted with other blocks.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A ceiling mount for a security camera, the ceiling mount comprising:
    (a) a mount body, comprising:
        (i) a back end located above a bottom of a ceiling when the ceiling mount is mounted; and
        (ii) a front end connected to the back end and located below the bottom of the ceiling when the ceiling mount is mounted, the front end comprising a channel access port; and
    (b) a clamp secured to the mount body, the clamp comprising:
        (i) a force application member positioned to compress the ceiling against the front end when the clamp is closed and positioned to permit the ceiling to pass between the force application member and the front end when the clamp is open;
        (ii) a compression coil spring, biasing the force application member, that is in a relatively deflected position when the clamp is open and in a relatively undeflected position when the clamp is closed, wherein the clamp is lockable in a loaded state when the spring is in the relatively deflected position and can be released from the loaded state by actuating a release mechanism located below the ceiling when the ceiling mount is mounted, and wherein the channel access port is aligned with the longitudinal axis of the spring and is for receiving the release mechanism; and
        (iii) a channel along which the spring is located,
        wherein the force application member comprises a flap having one end in the channel and a flap body connected to the one end in the channel and wherein the end of the flap in the channel is movable along the channel to contact the front end.

2. The ceiling mount of claim 1 wherein the ceiling mount further comprises the release mechanism and the release mechanism is secured to the mount body.

3. The ceiling mount of claim 1 wherein the channel comprises a channel wall that prevents the ceiling from encroaching into the channel.

4. The ceiling mount of claim 3 wherein the flap is rotatable about the longitudinal axis of the channel between a retracted position in which the flap body abuts against the back end and an extended position in which the flap body is spaced from the back end.

5. The ceiling mount of claim 4 wherein when in the extended position the flap body crosses the periphery of a portion of the front end pressed against the bottom of the ceiling when the ceiling mount is mounted to the ceiling.

6. The ceiling mount of claim 4 wherein the back end further comprises a recess shaped to receive the flap body and to prevent the flap from moving along the channel, wherein the recess is located adjacent the channel and spaced from the front end such that the flap body is rotatable into the recess when the spring is in the relatively deflected position.

7. The ceiling mount of claim 6 wherein the back end further comprises an outwardly extending protrusion located between the recess and the channel, wherein the flap body comprises a slot shaped to permit the protrusion to pass therethrough and wherein a top side of the protrusion is angled downwards towards the front end.

8. The ceiling mount of claim 1 wherein the back end comprises a camera opening for receiving the security camera and the front end comprises a flange along at least a portion of the camera opening.

9. The ceiling mount of claim 8 wherein the channel access port extends through the flange.

10. The ceiling mount of claim 1 further comprising a screw head facing the channel access port and located at the end of the coil spring nearest the channel access port.

11. A security camera assembly, comprising:
(a) a security camera; and
(b) a ceiling mount, comprising:
  (i) a mount body to which the security camera is attached, the mount body comprising:
    (1) a back end located above a bottom of a ceiling when the ceiling mount is mounted; and
    (2) a front end connected to the back end and located below the bottom of the ceiling when the ceiling mount is mounted, the front end comprising a channel access port; and
  (ii) a clamp secured to the mount body, the clamp comprising:
    (1) a force application member positioned to compress the ceiling against the front end when the clamp is closed and positioned to permit the ceiling to pass between the force application member and the front end when the clamp is open;
    (2) a compression coil spring, biasing the force application member, that is in a relatively deflected position when the clamp is open and in a relatively undeflected position when the clamp is closed, wherein the clamp is lockable in a loaded state when the spring is in the relatively deflected position and can be released from the loaded state by actuating a release mechanism located below the ceiling when the ceiling mount is mounted, and wherein the channel access port is aligned with the longitudinal axis of the spring and is for receiving the release mechanism; and
    (3) a channel along which the spring is located, wherein the force application member comprises a flap having one end in the channel and a flap body connected to the one end in the channel and wherein the end of the flap in the channel is movable along the channel to contact the front end.

12. A method for mounting a security camera assembly comprising a security camera attached to a ceiling mount, the method comprising:
(a) prior to inserting a back end of the ceiling mount into a ceiling space:
  (i) drilling a hole in a ceiling sized to accept the back end but not a front end of the ceiling mount that is connected to the back end;
  (ii) opening a clamp that comprises part of the ceiling mount, wherein opening the clamp comprises moving a spring used to bias the clamp from a relatively undeflected position to a relatively deflected position and wherein the clamp permits a ceiling to pass between the clamp and the front end when open; and
  (iii) locking the clamp open;
(b) placing the back end of the ceiling mount in the ceiling space; and
(c) while the back end of the ceiling mount is in the ceiling space, releasing the clamp to permit the spring to close the clamp by inserting a release mechanism through an aperture in the front end, wherein the clamp clamps the ceiling between the back and front ends when closed.

13. The method of claim 12 further comprising pressing the front end against a bottom of the ceiling while closing the clamp.

14. The method of claim 12 wherein:
(a) the clamp comprises a flap having a flap body that is movable along and rotatable on the back end;
(b) the back end comprises a recess shaped and located to receive the flap body when the clamp is open;
(c) the method further comprises rotating the flap body away from the back end prior to locking the clamp open;
(d) opening the clamp comprises moving the flap away from the front end;
(e) locking the clamp open comprises rotating the flap body into the recess; and
(f) releasing the clamp comprises rotating the flap body out of the recess.

15. The method of claim 14 further comprising rotating the flap body outwards prior to permitting the spring to close the clamp clamping the ceiling with the flap body rotated outwards.

16. The method of claim 14 wherein the clamp comprises a channel, the spring comprises a compression coil spring located along the channel, the front end comprises a flange, the aperture comprises a channel access port aligned with the spring, and the back end comprises a camera opening that receives the security camera.

17. The method of claim 16 wherein one end of the flap is connected to the spring and moves along the channel when the spring deflects, the end of the flap connected to the spring movable along the channel to contact the front end.

18. A ceiling mount for a security camera, the ceiling mount comprising:
(a) a back end having a camera opening shaped to receive the security camera;
(b) a flange around at least a portion of the camera opening, the flange having a channel access port extending therethrough; and
(c) a clamp secured to the back end, the clamp comprising:
  (i) a channel aligned with the channel access port, wherein the channel has a length selected such that a distance between the end of the channel nearest the channel access port and the channel access port is less than a thickness of a ceiling to which the ceiling mount is to be mounted;

(ii) a compression coil spring extending along the channel and rotatable about the longitudinal axis of the channel; and
(iii) a flap having one end connected to the spring and that moves along the channel when the spring deflects, the end of the flap connected to the spring movable along the channel to contact the front end, wherein the length of the spring is selected such that the spring is at least deflected by a top of the ceiling when the flange is pressed against a bottom of the ceiling and the ceiling is between the flange and the flap.

* * * * *